United States Patent
Ramanan et al.

(10) Patent No.: US 12,475,177 B2
(45) Date of Patent: Nov. 18, 2025

(54) AUTOMATED MACHINE LEARNING-BASED DETECTION OF CORRECT IMPLEMENTATIONS FOR CONFIGURATION SETTINGS OF SOFTWARE-AS-A-SERVICE APPLICATIONS

(71) Applicant: Palo Alto Networks, Inc., Santa Clara, CA (US)

(72) Inventors: Nandini Ramanan, Sunnyvale, CA (US); William Redington Hewlett, II, Mountain View, CA (US); Mrunmayi Bharat Nandgaonkar, San Jose, CA (US); Anurag Mukund Phadke, Sunnyvale, CA (US); Sreejith Rajkumar, Danville, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/309,246

(22) Filed: Apr. 28, 2023

(65) Prior Publication Data

US 2024/0362277 A1 Oct. 31, 2024

(51) Int. Cl.
*G06F 16/951* (2019.01)
*G06N 3/0464* (2023.01)

(52) U.S. Cl.
CPC ......... *G06F 16/951* (2019.01); *G06N 3/0464* (2023.01)

(58) Field of Classification Search
None
See application file for complete search history.

(56) References Cited

U.S. PATENT DOCUMENTS

| | | | |
|---|---|---|---|
| 2018/0276404 A1* | 9/2018 | Dotan-Cohen | G06F 21/6245 |
| 2018/0288060 A1* | 10/2018 | Jackson | H04L 63/107 |
| 2019/0028346 A1* | 1/2019 | Pallas | H04L 41/0866 |
| 2021/0264116 A1* | 8/2021 | Thor | G06F 40/284 |
| 2021/0314338 A1* | 10/2021 | Howe | H04L 63/1408 |

\* cited by examiner

*Primary Examiner* — Apu M Mofiz
(74) *Attorney, Agent, or Firm* — Gilliam IP PLLC (57) ABSTRACT

An automated software-as-a-service (SaaS) security posture management (SSPM) system disclosed herein detects and maintains security posture for SaaS applications according to correct implementation of configuration settings. Based on detecting a previously unseen SaaS application with unknown implementation of configuration settings, the SSPM system scrapes the Internet for web content for the SaaS application and preprocesses/inputs the web content into a machine learning model to obtain predictions of correct/incorrect implementation of configuration settings as output. Based on the predictions not having sufficiently high confidence, the SSPM system obtains additional application content by logging into the SaaS application and scraping locally rendered pages therein. The application content is preprocessed/input to the machine learning model to obtain additional high confidence predictions.

20 Claims, 8 Drawing Sheets

AUTOMATED MACHINE LEARNING-BASED DETECTION OF CORRECT IMPLEMENTATIONS FOR CONFIGURATION SETTINGS OF SOFTWARE-AS-A-SERVICE APPLICATIONS

BACKGROUND

The disclosure generally relates to CPC class G06F and subclasses G06F 21/50 and/or 21/56.

Software-as-a-service (SaaS) security posture management (SSPM) is a framework for automated detection and maintenance of configuration settings for SaaS applications that, when incorrectly implemented, represent security risk for organizations running SaaS applications. Configuration settings have best practice values that conform to industry standard security compliance, such as recommended optimal time periods for idle timeouts, session timeouts, and inactivity timeouts, recommended complexity requirements, expiration periods, and length requirements for passwords, recommended allowable Internet Protocol (IP) addresses, etc. Once new SaaS applications are detected at organizations, SSPM is maintained periodically to account for changing best practices and changing configuration settings for SaaS applications running at the organizations.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

Manually inspecting correct configuration settings for SSPM requires an unreasonable burden of manual resources for both detecting and maintaining a strong security posture across SaaS applications. Misconfigured settings represent an additional attack vector for security exposure across an organization implementing hundreds or thousands of SaaS applications. An automated SSPM analysis system (SSPM system) disclosed herein scrapes for content related to SaaS applications and predicts correct and incorrect implementation of configuration settings for SaaS applications at an organization relative to industry standard best practices that codify correct configuration settings.

Based on detecting an identifier of a SaaS application at an organization that has not been previously detected or analyzed for SSPM, the SSPM system scrapes Uniform Resource Locators (URLs) under a domain name of the SaaS application for web content. The URLs under the domain name comprise URLs accessible (i.e., embedded in hyperlinks of web pages) from a highest-level URL at the domain name that are subdomains of the URL. The SSPM system preprocesses and inputs the web content into a machine learning model to obtain as outputs confidence values of correct implementation of each of a list of configuration settings. If one or more of the confidence values are above one or more corresponding threshold values, then the SSPM system stores the predictions in a SSPM configuration database that indicates configuration settings that are correctly implemented across SaaS applications of the organization. Otherwise, the SSPM system logs into the SaaS application and scrapes application content from locally rendered pages displayed to an endpoint device. The SSPM system preprocesses and inputs the application content into the machine learning model to obtain as outputs additional confidence values of correct implementation of the configuration settings. Correct implementation of configuration settings corresponding to additional confidence values above respective thresholds are stored in the SSPM configuration database.

During training, the machine learning model for prediction of correct/incorrect implementation of configuration settings of SaaS applications leverages lists of keywords corresponding to each configuration setting to determine relative importance of each configuration setting for SaaS application security. The loss function of the machine learning model uses weights that represent the relative importance of each of the configuration settings for SSPM according to various keywords described in documentation for SaaS applications with known correct/incorrect implementation of configuration settings. The result is high quality prediction of correct configuration setting implementation that facilitates efficient inspection and verification by domain-level experts and reduces workload for manual inspection in SSPM.

Example Illustrations

Figure 1:
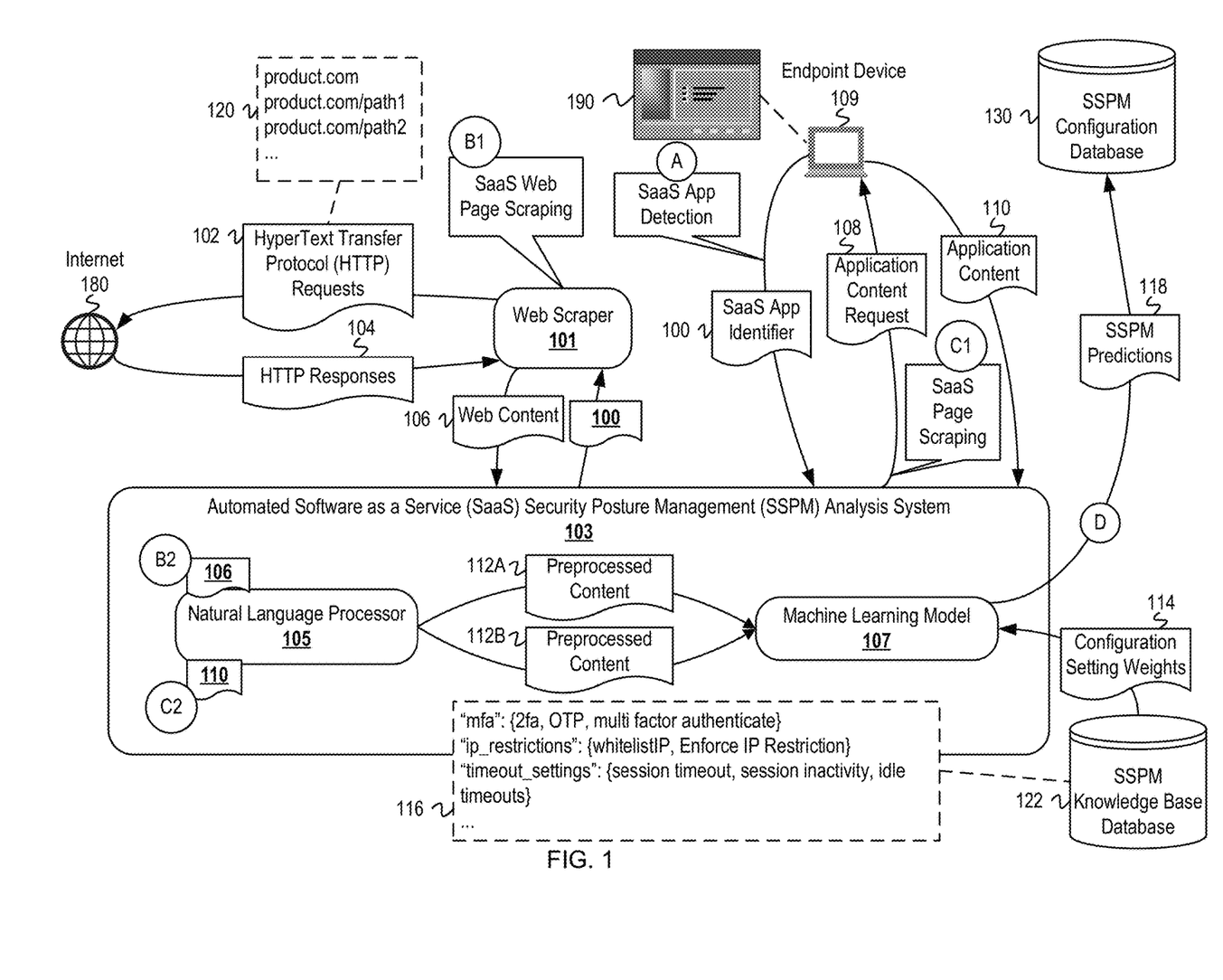
FIG. 1 is a schematic diagram of an example system for automated prediction of correct/incorrect implementation of configuration settings for SSPM with a machine learning model and web/application content scraping.

FIG. 1 is a schematic diagram of an example system for automated prediction of correct/incorrect implementation of configuration settings for SSPM with a machine learning model and web/application content scraping. SSPM is monitored across SaaS applications at an organization by an automated SSPM analysis system (SSPM system) 103. The SSPM system 103 determines whether configuration settings of a SaaS application 190 with identifier 100 are correctly implemented in several stages. Correct implementation of configuration settings comprises industry standard best practice configuration settings for correct implementation and can be adapted to context of the SaaS application 190 and organization, for instance when the SaaS application 190 and/or organization relate to protected health information or sensitive financial information. First, the SSPM system 103 processes web content 106 scraped from domains of the SaaS application 190 with a natural language processor 105 and predicts whether configuration settings are correctly implemented with a machine learning model 107. If the machine learning model 107 is not sufficiently confident in predictions for the web content 106, then the SSPM system 103 proceeds with predicting whether configuration settings are correctly implemented with application content 110 scraped from locally rendered pages of the SaaS application 190. Any configuration settings without sufficiently confident predictions as being correctly implemented by the machine learning model 107 are indicated as incorrectly implemented.

FIG. 1 is annotated with a series of letters A, B1, B2, C1, C2, and D. Each stage represents one or more operations. Stages B and C are separated into two parts comprising B1, B2 and C1, C2, respectively, to illustrate a distinction between, at each stage, operations for scraping content and operations for preprocessing/inputting the content into a machine learning model for prediction of correct implementation of configuration settings. Although these stages are ordered for this example, the stages illustrate one example to aid in understanding this disclosure and should not be used to limit the claims. Subject matter falling within the scope of the claims can vary from what is illustrated.

At stage A, a SaaS application 190 corresponding to a SaaS application identifier (identifier) 100 is detected at an endpoint device 109. For instance, a firewall (not depicted) monitoring processes at the endpoint device 109 can detect a process spawned by the SaaS application 190 and can compare the identifier 100 to a list of identifiers of known SaaS applications to determine whether the identifier 100 is not on the list and/or is indicated as having unknown implementation of configuration settings. The firewall can be running in the cloud to intercept and analyze traffic between the endpoint device 109 and the Internet 180 or can be running locally on the endpoint device 109 (e.g., as an agent). Based on determining that the identifier 100 corresponds to a previously unseen SaaS application and/or a SaaS application with unknown implementation of configuration settings, then the endpoint device 109 or a firewall monitoring the endpoint device 109 communicates the identifier 100 to the SSPM system 103 for analysis of configuration settings for the SaaS application 190.

At stage B1, based on detecting the SaaS application 190, the SSPM system 103 communicates the identifier 100 to a web scraper 101. The web scraper 101 then identifies a highest-level domain associated with the SaaS application 190. For instance, the web scraper 101 can query a search engine with the identifier 100 and can identify a most trustworthy result from the search engine as a Uniform Resource Locator (URL) corresponding to a highest-level domain of the SaaS application 190. Alternatively, the web scraper 101 can compare the identifier 100 against a list or other data structure that stores known highest-level domains of SaaS applications.

Once the web scraper 101 identifies a highest-level domain, the web scraper 101 iteratively scrapes web pages corresponding to subdomains of the highest-level domain to extract web content 106. The web scraper 101 communicates a HyperText Transfer Protocol (HTTP) request in HTTP requests 102 to the Internet 180 for each subdomain and receives an HTTP response in HTTP responses 104 in response. The web scraper 101 iteratively scrapes web pages corresponding to subdomains of the highest-level domain by identifying hyperlinks in web pages starting at the highest-level domain and, if the hyperlink corresponds to a subdomain of the highest-level domain, scrapes the web page corresponding to the hyperlink and any hyperlinks therein that are also subdomains of the highest-level domain. The iterative scraping of hyperlinks can occur based on breadth-first or depth-first search of hyperlinks in web pages for subdomains. To exemplify, example highest-level domain and subdomain URLs 120 comprise the following:

product.com
product.com/path1
product.com/path2
. . .

In this embodiment, the web scraper 101 can determine if hyperlinks in web pages are subdomains of a highest-level domain with URL "product.com" based on whether the URLs in hyperlinks are extensions of the URL "product.com".

The web scraper 101 iteratively scrapes subdomains of the highest-level domain until one or more termination criteria are satisfied. The termination criteria can include criteria that a threshold number of subdomains have been scraped, that there are no remaining hyperlinks in previously scraped web pages corresponding to subdomains of the highest-level domain, that a maximal depth or breadth of search has been reached, that a threshold amount of web content 106 has been scraped, etc. When the termination criteria are satisfied, the web scraper 101 returns the web content 106 scraped from the highest-level domain and all visited subdomains to the SSPM system 103.

At each domain in the HTTP responses 104, the web scraper 101 scrapes content by extracting HyperText Markup Language (HTML) elements from the HTTP responses 104. Additionally, for image elements in the HTTP responses 104, the web scraper 101 performs optical character recognition to extract natural language content from the images as the web content 106. The web scraper 101 can extract content from additional sections of the HTTP responses 104 such as HTTP header fields. The web scraper 101 can further perform operations to remove extraneous syntax not corresponding to natural language content from the web content 106.

At stage B2, the SSPM system 103 inputs the web content 106 into the natural language processor 105. The natural language processor 105 performs preprocessing steps such as parsing and splitting camel case words, splitting blended words with an algorithm such as the Viterbi algorithm, translating foreign language words, removing punctuation, URLs, and alphanumeric characters, etc. to effectively normalize the web content 106 prior to input into the machine learning model 107. The natural language processor 105 inputs the preprocessed content 112A into the machine learning model 107 to obtain SSPM predictions 118 that the machine learning model 107 outputs. The SSPM predictions 118 comprise confidence values that the SaaS application corresponding to the identifier 100 correctly implements each of a plurality of configuration settings. If one or more of the confidence values is sufficiently high (e.g., above a threshold), then operations skip to stage D for storing SSPM predictions 118 and performing corrective action thereof. Otherwise, operations proceed to stage C1 for additional analysis of configuration settings by logging into the SaaS application and analyzing locally rendered pages.

At stage C1, the SSPM system 103 communicates an application content request 108 to the endpoint device 109 for scraping pages of the SaaS application 190. The application content request 108 at least comprises the identifier 100 and can further comprise search parameters that specify how to perform iterative search/scraping of locally rendered pages for the SaaS application 190. The endpoint device 109 logs into the SaaS application 190, locally renders pages of the SaaS application 190 (e.g., via a dashboard of the SaaS application 190), and scrapes content from the locally rendered pages to generate application content 110. For instance, the endpoint device 109 can be configured to detect clickable elements of a dashboard of the SaaS application 190 and can iteratively access locally rendered pages accessible via the clickable elements of the dashboard.

Once one or more termination criteria for searching locally rendered pages of the SaaS application 190 are satisfied, the endpoint device 109 returns the application content 110 to the SSPM system 103. The termination criteria can comprise criteria that a threshold number of locally rendered pages have been scraped, that a threshold depth or breadth in a depth-first or breadth-first search of locally rendered pages has been reached, that there are no more locally rendered pages accessible from previously scraped pages, etc.

Iterative access and scraping of web content 106 and application content 108 at stages B1 and C1, respectively, can be implemented with $3^{rd}$ party libraries such as Beautiful Soup for scraping of content and Selenium for iteratively accessing content in web pages and locally rendered pages by inspecting elements therein. Alternatively, the SSPM system 103 can implement local libraries with distinct search and scraping algorithms that are conducive to scraping web content 106 and application content 108.

At stage C2, the natural language processor 105 preprocesses the application content 110 to generate preprocessed content 112B and inputs the preprocessed content 112B into the machine learning model 107 to obtain SSPM predictions 118 that the machine learning model 107 outputs. If none of the confidence values in the SSPM predictions 118 at stage C2 for correct implementation of corresponding configuration settings are sufficiently high (e.g., above a threshold), then the machine learning model 107 adds an indication to the SSPM predictions 118 that all of the configuration settings are unknown to have correct implementation. Otherwise, the machine learning model 107 indicates any configuration settings with sufficiently high confidence values as predicted to be correctly implemented and indicates the remaining configuration settings as predicted to be incorrectly implemented in the SSPM predictions 118.

At stage D, the machine learning model 107 communicates the SSPM predictions 118 to a SSPM configuration database 130. The machine learning model 107 was previously trained to predict correct implementation of configuration settings of SaaS applications using configuration setting weights 114 stored in a SSPM knowledge base database 122, as will be described in greater detail with reference to FIG. 2. The configuration setting weights 114 indicate relative importance of each configuration setting for secure configuration of SaaS applications. The configuration setting weights 114 are generated prior to training the machine learning model 107 based on occurrence of keywords for each configuration setting in documentation of SaaS applications with known correct/incorrect implementation of configuration settings. Example keywords for configuration settings 116 comprise the following:

"mfa": {2fa, OTP, multi factor authenticate}
"ip_restrictions": {whitelistIP, Enforce IP Restriction}
"timeout_settings":{session timeout, session inactivity, idle timeouts}
. . .

Additional configuration settings comprise password settings, administrative user settings, data sharing permission settings, accessing device settings, etc. The configuration setting weights 114 are hard coded into the machine learning model 107 as weights for a loss function. Operations for determining the configuration setting weights 114 prior to training the machine learning model 107 are described in greater detail in reference to FIG. 2.

For configuration settings predicted as being correctly implemented, the SSPM system 103 can perform a substring search of the web content 106 and/or application content 110 for sections of content that are demonstrative of correct implementation. For instance, the SSPM system 103 can query the SSPM knowledge base database 122 for keywords of correctly implemented configuration settings and can search the web content 106 and/or application content 110 for the keywords. The SSPM system 103 can include the identified sections of content in association with correctly implemented configuration settings in the SSPM predictions 118.

A firewall for an organization periodically accessing the SSPM configuration database 130 identifies new entries for detected SaaS applications and corresponding indications of correct/incorrect implementations of configuration settings. Based on detecting new SaaS applications (e.g., the SaaS application 190) with incorrect configuration settings, the firewall remediates the new SaaS applications by correcting incorrect configuration settings with best practice values for those settings. In some embodiments, based on a setting by the organization, the SSPM system 103 can remediate incorrectly implemented configuration settings at stage D. Moreover, while FIG. 1 is depicted for predicting correct/incorrect implementation of configuration settings based on detecting a SaaS application not previously seen or with unknown implementation of configuration settings, the SSPM system 103 can continuously and periodically (e.g., every month) scrape for web/application content and generate additional predictions to maintain continued security posture at the organization as SaaS application settings change.

Figure 2:
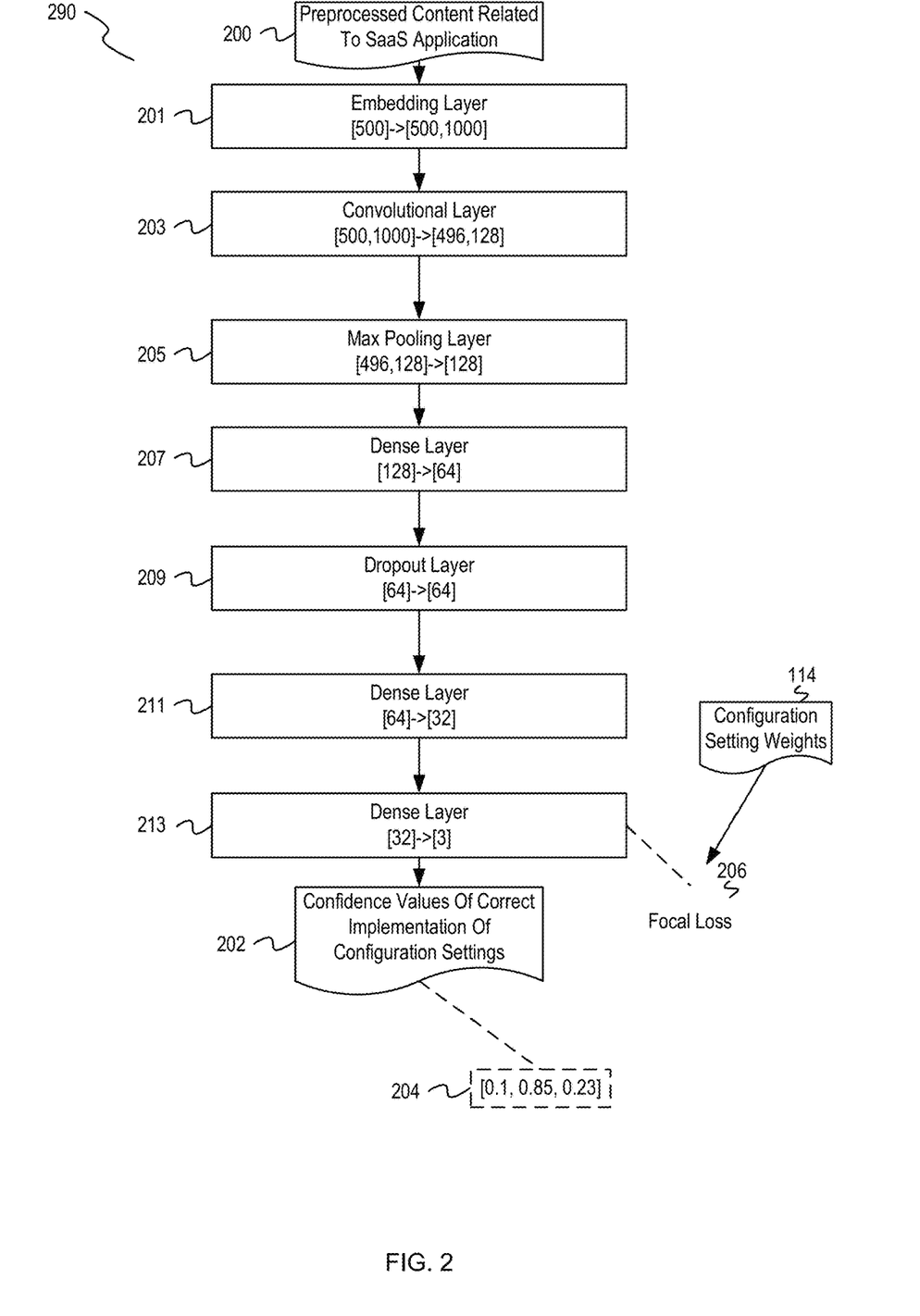
FIG. 2 is a schematic diagram of an example architecture of a neural network for predicting correct implementation of configuration settings for SaaS applications.

FIG. 2 is a schematic diagram of an example architecture of a neural network for predicting correct implementation of configuration settings for SaaS applications. A neural network 290 comprises an embedding layer 201 that receives preprocessed content related to a SaaS application (hereinafter simply "content") 200 as input. The content 200 can comprise content from scraping web pages for domains of the SaaS application and/or content scraped from locally rendered pages accessible by logging into the SaaS application, e.g., at an endpoint device. The embedding layer 201 comprises an input vector of length 500 and an output matrix of size 500×1000. The embedding layer 201 has a fixed length input and the content 200 is preprocessed with natural language processing to achieve a fixed length. For instance, the content 200 can be truncated to have a fixed number of tokens and/or padded with zero/empty tokens, and the tokens can be projected into fixed length numerical vectors using Global Vectors for Word Representation (GloVe) word embeddings.

The embedding layer 201 outputs to a convolutional layer 203 with inputs of size 500×1000 and outputs of size 496×128. The convolutional layer 203 outputs to a max pooling layer 205 with inputs of size 496×128 and outputs of length 128. The max pooling layer 205 outputs to a dense layer 207 with inputs of length 128 and outputs of length 64. The dense layer 207 outputs to a dropout layer 209 with inputs of length 64 and outputs of length 64. The dropout layer 209 outputs to a dense layer 211 with inputs of length 64 and outputs of length 32. The dense layer 211 outputs to a dense layer 213 with inputs of length 32 and outputs of length 3. The output length of the dense layer 213 corresponds to the number of configuration settings that the neural network 290 is trained to predict. Output of the neural network 290 comprises confidence values of correct implementation of configuration settings 202 such as example confidence values 204: [0.1, 0.85, 0.23]

The example confidence values 204 indicate high confidence of correct implementation of a configuration setting corresponding to the second entry and low confidence of correct implementation of configuration settings corresponding to the first and third entries. FIG. 2 provide example parameters, layer types, and order of layers for a neural network architecture for prediction configuration settings being correctly or incorrectly implemented. The neural network 290 can vary with respect to type and size of layers depending on the amount of available training data, the types of configuration settings predicted as being correctly or incorrectly implemented, etc.

The neural network 290 is trained according to a focal loss 206 that uses the configuration setting weights 114 indicating relative importance of confidence values for each type of configuration setting output by the neural network 290. The configuration setting weights 114 are determined according to statistics related to occurrence of keywords corresponding to each configuration setting in documentation of SaaS applications with known correct implementation of one or more configuration settings. The statistics can be computed according to term frequency-inverse document frequency (tf-idf) statistics of keywords for each configuration settings in the documentation. Alternatively, Latent Dirichlet Allocation (LDA)-based statistics can be used. To exemplify, topics (i.e., configuration settings) for keywords in the documentation are determined using LDA. Each topic $y_i$ for i=1 to n has associated keywords $x_{ij}$, j=1 to W. $C_{ij}$ is a count of the keyword $x_{ij}$ being assigned to topic $y_i$. Then weights for each keyword are determined as $$\phi_{ij} = \frac{c_{ij} + x}{\sum_{k=1}^{W} c_{kj} + WX},$$

where X is a random variable with Dirichlet distribution having parameter $\eta$ (typically $\eta<1$). The weight in the configuration setting weights 114 for each configuration setting $y_i$ is then determined as $\phi_i=\phi_{i1}\phi_{i2} \ldots \phi_{in}$. Other formulae for the configuration setting weights 114 based on the $\phi_{ij}$ that are in the interval [0, 1] can be used, for instance by a weighted average of the $\phi_{ij}$. Once the weights $\phi_i$ for each configuration setting are determined, the focal loss 206 can be computed as $\ell=\Sigma_{i=1}^{n}\alpha(1-y_{pred}^{i})^{\gamma\phi_i}y_{true}^{i}$, where $y_{true}^{i}$ are true labels for the ith configuration setting, $y_{pred}^{i}$ are predicted labels for the ith configuration setting represented as confidence values of correct implementation of the corresponding configuration setting, and $\alpha,\gamma$ are tunable weights. Other versions of loss formulae for focal loss adapted from cross entropy loss such as formulae incorporating a log $y_{true}^{i}$ factor into the summation are anticipated. More generally, any loss function such as cross entropy loss can be weighted using the configuration setting weights 114 to emphasize loss for configuration settings with higher relative importance so as to tune the neural network 290 to more accurately predict correct implementation of those configuration settings during training.

FIGS. 3-7 are flowcharts of example operations for predicting correctness of implementation of configuration settings for SaaS applications, maintaining correct implementation of configuration settings for SaaS applications across an organization, and training a machine learning model to predict correct implementation of configuration settings. The example operations are described with reference to an automated SSPM analysis system (SSPM system) for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 3:
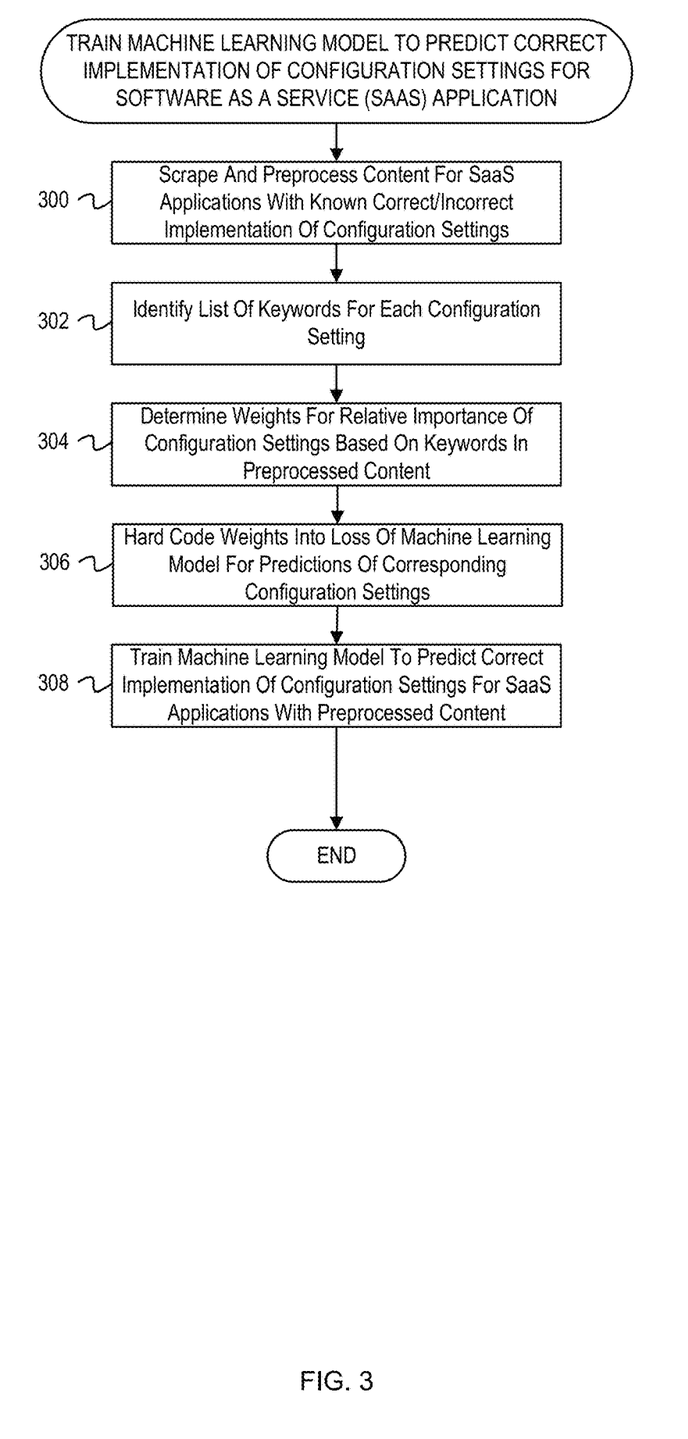
FIG. 3 is a flowchart of example operations for training a machine learning model to predict correct implementation of configuration settings for a SaaS application.

FIG. 3 is a flowchart of example operations for training a machine learning model to predict correct implementation of configuration settings for a SaaS application. At block 300, a SSPM system scrapes and preprocesses content for SaaS applications with known correct/incorrect implementation of configuration settings. The SSPM system can scrape the content from the web and/or by logging into and running the SaaS application at an endpoint device for a user or organization implementing the SaaS application to access locally rendered pages. The SSPM system can preprocess the content with any standard natural language processing techniques.

At block 302, the SSPM system identifies a list of keywords for each configuration setting. The SSPM system can identify the keywords according to tf-idf statistics of keywords in content for SaaS applications that implement the corresponding configuration setting, or according to topics (i.e., configuration settings) predicted for the keywords with a generative statistical model such as LDA. Alternatively, in some embodiments the keywords can be identified by a domain-level expert with knowledge of each configuration setting.

At block 304, the SSPM system determines weights for relative importance of each configuration setting based on the keywords in the preprocessed content. The weights can be determined based on frequency statistics of the keywords such as tf-idf statistics for keywords corresponding to each configuration setting. Alternatively, the weights can be computed based on weights determined during LDA for assigning configuration settings to keywords.

At block 306, the SSPM system hard codes the weights into a loss function of a machine learning model for predictions of corresponding configuration settings. For instance, the loss function can be a focal loss function incorporating the weights such that during training, the loss is amplified for incorrect predictions of configuration settings having higher weights and reduced for incorrect predictions of configuration settings having lower weights. Alternative loss functions to focal loss that incorporate the weights as such can be implemented.

At block 308, the SSPM system trains the machine learning model to predict correct implementation of configuration settings for SaaS applications with preprocessed content. The training data comprises the preprocessed content as well as labels corresponding to known correct/incorrect implementation of configuration settings for the SaaS applications. The machine learning model is trained according to its architecture and with a loss function that incorporates weights representing relative importance of each configuration setting. Training proceeds until at least a first criterion of termination criteria for the machine learning model are satisfied. The training criteria can vary with type and/or architecture such as a threshold number of epochs/batches, convergence of internal parameters of the machine learning model across iterations, sufficiently small training/testing/validation loss, etc.

Figure 4:
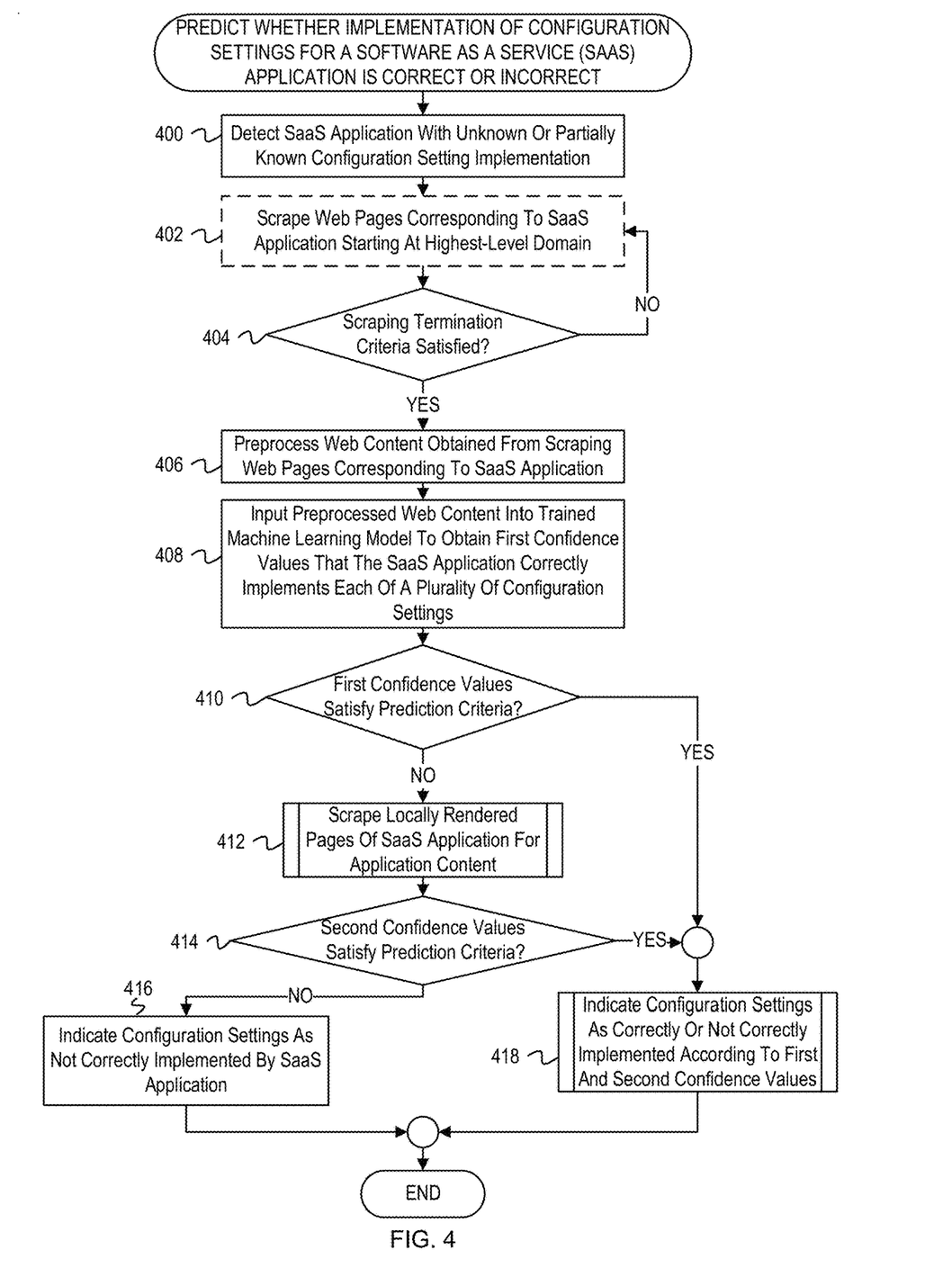
FIG. 4 is a flowchart of example operations for predicting whether implementation of configuration settings for a SaaS application is correct or incorrect.

FIG. 4 is a flowchart of example operations for predicting whether implementation of configuration settings for a SaaS application is correct or incorrect. At block 400, an automated SSPM analysis system (SSPM system) detects a SaaS application with an unknown or partially known configuration setting implementation. The SSPM system can detect the SaaS application as running at an endpoint device based on monitoring processes at the endpoint device and comparing an identifier of each process against a list of identifiers of SaaS applications with known configuration setting implementations. Alternatively, the SSPM system can search a database with the identifier for SaaS applications with at least one unknown configuration setting. The SSPM system can monitor for execution of SaaS applications across an organization, e.g., at endpoint devices and/or servers running on IP networks of the organization and/or endpoint devices monitored by one or more firewalls managing cybersecurity for the organization.

At block 402, a web scraper scrapes web pages corresponding to the detected SaaS application starting at a highest-level domain. The web scraper can query a search engine with an identifier of the SaaS application to identify a highest-level domain of the SaaS application. Additionally or alternatively, the web scraper can compare an identifier of the SaaS application against a list of identifiers of SaaS applications and their associated known highest-level domains. Subsequently, the web scraper iteratively scrapes web pages for the highest-level domain and subdomains of the highest-level domain according to a scraping algorithm. The scraping algorithm can vary with respect to implementation and depending on operational parameters. In a typical embodiment, the web scraper searches for hyperlinks in a web page of the highest-level domain that comprise subdomains and iteratively searches web pages of the subdomains for additional hyperlinks. Iterative searching can occur according to recursive or dynamic programming algorithms such as breadth-first search, depth-first search, etc. When determining whether hyperlinks are subdomains of the highest-level domain, the web scraper can determine whether URLs for the hyperlinks are extensions of a URL for the highest-level domains or satisfy a regular expression for subdomains of the highest-level domain. Block 402 is depicted with a dashed line to indicate that scraping of web pages occurs continuously until triggered by termination criteria at block 404.

At block 404, the web scraper determines whether one or more scraping termination criteria are satisfied. The termination criteria depend on a type of algorithm used for searching for subdomains of the highest-level domain for the SaaS application. For instance, for breadth-first or depth-first search of hyperlinks, the termination criteria can comprise a criterion (a) that a threshold number of web pages have been scraped, a threshold depth and/or breadth has been reached, that all hyperlinks corresponding to subdomains of the highest-level domain from web pages accessible to the search algorithm have been reached, etc. If the termination criteria are satisfied, operational flow proceeds to block 406. Otherwise, operational flow returns to block 400.

At block 406, the SSPM system preprocesses web content obtained from scraping web pages corresponding to the SaaS application. The SSPM system can use various natural language processing methods such as removing camel case, removing ranges of American Standard Code for Information Interchange (ASCII) characters, tokenization, word embeddings, etc. The web content is preprocessed into a format that a trained machine learning model (e.g., the machine learning model trained by the operations described in reference to FIG. 3) accepts as input. For instance, when the trained machine learning model comprises an embedding layer then the SSPM system preprocesses the web content as a string of characters. Alternatively, the web content can be transformed via word embeddings during preprocessing.

At block 408, the SSPM system inputs the preprocessed web content into a trained machine learning model to obtain first confidence values that the SaaS application correctly implements each of a plurality of configuration settings as output of the machine learning model. The machine learning model was trained on preprocessed content scraped from web content and application content for SaaS applications with labels indicating known correct and incorrect implementation of configuration settings for those SaaS applications based on industry standard best practice values of configuration settings. For instance, the machine learning model can comprise a neural network such as a convolutional neural network with parameters tuned to accurate predict configuration settings being correctly or incorrectly implemented.

At block 410, the SSPM system determines whether the first confidence values satisfy prediction criteria. The prediction criteria comprise criteria that the confidence values are sufficiently confident for identifying one or more correctly implemented configuration settings. For instance, the prediction criteria can comprise that at least one of the first confidence values is above a threshold confidence value, that at least one confidence value is above a threshold particular to that confidence value (e.g., based on a type of the configuration setting corresponding to that value), that an average or other statistic computed for the first confidence values is above a threshold, etc. In some embodiments, the threshold confidence value can be uniform across all configuration settings (e.g., 0.8). If the first confidence values satisfy the prediction criteria, operational flow proceeds to block 418. Otherwise, operational flow proceeds to block 412.

At block 412, the SSPM system scrapes locally rendered pages of the SaaS application for application content. The SSPM system scrapes the locally rendered pages by logging into the SaaS application and iteratively scraping the pages locally rendered for application content. The SSPM system then generates second confidence values of correct implementation of configuration settings by inputting content scraped from the locally rendered pages into the machine learning model and obtaining the second confidence values from output. The operations at block 412 are described in greater detail in reference to FIG. 5.

At block 414, the SSPM system determines whether the second confidence values satisfy prediction criteria. The prediction criteria can be that the second confidence values are above corresponding threshold confidence values. The threshold confidence values can vary by corresponding configuration setting, for instance to be higher for configuration settings more important for SaaS application security (e.g., as deemed important based on expert knowledge). If the second confidence values satisfy the prediction criteria, operational flow proceeds to block 418. Otherwise, operational flow proceeds to block 416.

At block 416, the SSPM system indicates the configuration settings as not being correctly implemented by the SaaS application. The SSPM system can indicate the incorrect implementations to a user or organization running the SaaS application, for instance via a dashboard at an endpoint device. The SSPM system can additionally recommend best practice values for correct implementation of each configuration setting, for instance according to implementations recommended by the Fast IDentity Online (FIDO) Alliance or the National Institute of Standards and Technology (NIST). The best practice values and configuration settings can vary depending on types of SaaS applications and organizations, for instance SaaS applications handling protected health information can have configuration settings (and corresponding best practice values) that enforce privacy according to regulations of the Health Insurance Portability and Accountability Act and SaaS application handling private financial data can have configuration settings that enforce privacy according to the Payment Card Industry Data Security Standard.

At block 418, the SSPM system indicates configuration setting(s) as being correctly or not correctly implemented according to the first and second confidence values. The operations at block 418 are described in greater detail in reference to FIG. 6.

Figure 5:
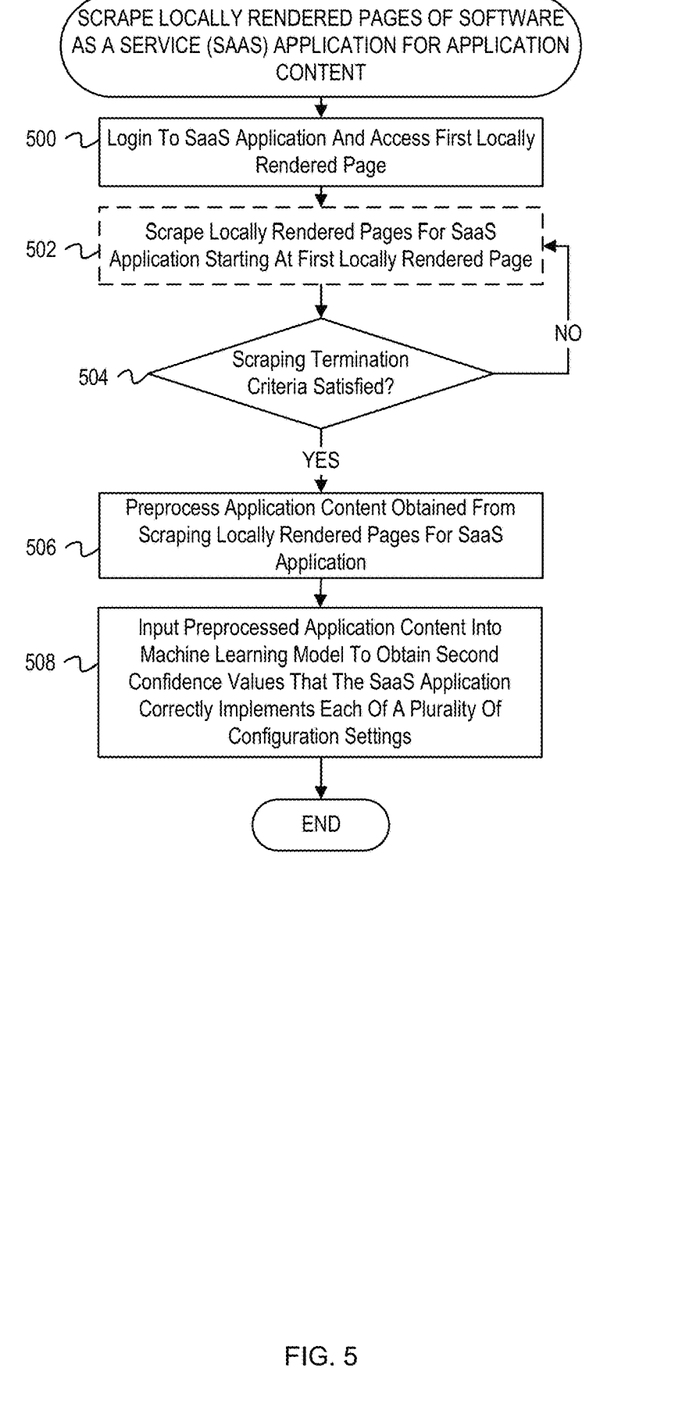
FIG. 5 is a flowchart of example operations for scraping locally rendered pages of a SaaS application for application content.

FIG. 5 is a flowchart of example operations for scraping locally rendered pages of a SaaS application for application content. At block 500, a SSPM system logs into the SaaS application and accesses a first locally rendered page. The SSPM system can login to the SaaS application using credentials of a user or organization running the SaaS application. In some embodiments, to avoid data loss of user credentials, the SSPM system can instruct the user or organization to login to the SaaS application. The first locally rendered page can comprise a homepage of the SaaS application such as a dashboard including hyperlinks to pages allowing access to various functionalities of the SaaS application.

At block 502, the SSPM system scrapes locally rendered pages for the SaaS application starting at the first locally rendered page. For instance, the SSPM system can intercept communications from the cloud to an endpoint device running the SaaS application (e.g., at a firewall) and can scrape content from the communications. Alternatively, the SSPM system can be running at the endpoint device and can scrape the content from the communications received at the endpoint device. From the first locally rendered page, the SSPM system iteratively scrapes locally rendered pages accessible from the first locally rendered page. For instance, the SSPM system can request for additional locally rendered pages via hyperlinks indicated in a dashboard of the SaaS application or can query the cloud for additional pages to be locally rendered according to an Application Programming Interface (API) for the SaaS application. Block 502 is depicted with a dashed outline to indicate that the SSPM system scrapes locally rendered pages iteratively until an external trigger intercedes.

At block 504, the SSPM system determines whether one or more scraping termination criteria are satisfied. The scraping termination criteria can comprise a criterion (a) that all accessible content starting from a first locally rendered page has been scraped, that a threshold number of locally rendered pages have been scraped, that a predetermined time period for scraping has elapsed, etc. If the scraping termination criteria are satisfied, operational flow proceeds to block 506. Otherwise, operational flow returns to block 502.

At block 506, the SSPM system preprocesses application content obtained from scraping the locally rendered pages for the SaaS application. The SSPM system preprocesses the application content with natural language processing such as word embeddings, tokenization, etc.

At block 508, the SSPM system inputs the preprocessed application content into a machine learning model to obtain second confidence values that the SaaS application correctly implements each of a plurality of configuration settings. For instance, the machine learning model can comprise a convolutional neural network with an embedding layer to learn word embeddings. The machine learning model can further be trained with a loss function that incorporates weights that indicate relative importance of each configuration setting according to statistical analysis of keywords for each configuration setting in documentation of SaaS applications. The statistical analysis can comprise tf-idf statistics or can be based on LDA according to the foregoing description.

Figure 6:
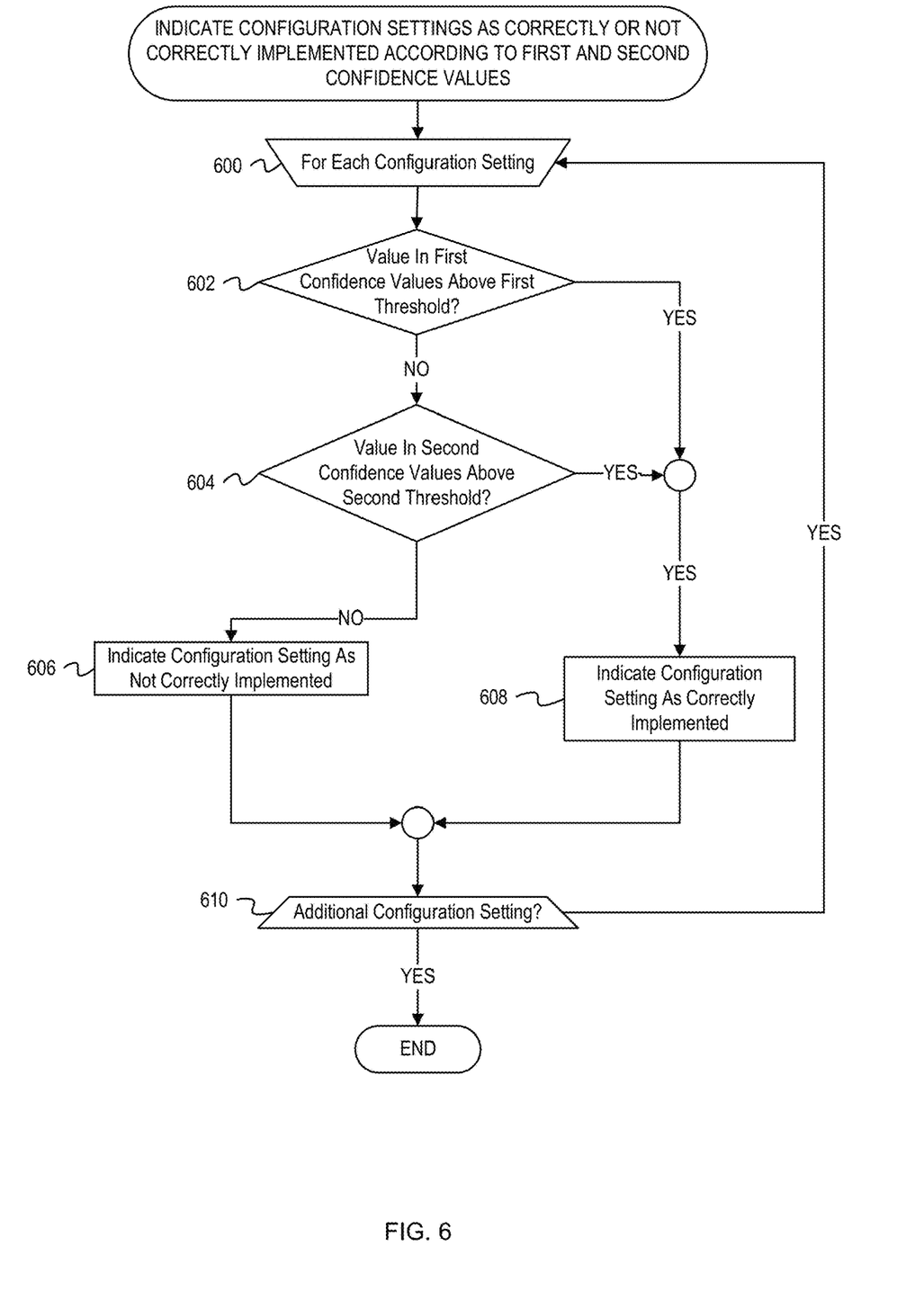
FIG. 6 is a flowchart of example operations for indicating configuration settings as being correctly or not correctly implemented according to first and second confidence values.

FIG. 6 is a flowchart of example operations for indicating configuration settings as being correctly or not correctly implemented according to first and second confidence values. The first confidence values were obtained as outputs by a trained machine learning model to predict confidence that configuration settings are correctly implemented by a SaaS application based on inputting preprocessed web content for the SaaS application. The second confidence vales were obtained as outputs by the trained machine learning model to predict confidence that the configuration settings are correctly implemented by the SaaS application based on inputting preprocessed application content for the SaaS application.

At block 600, a SSPM system iterates through configuration settings for the SaaS application. Each configuration setting corresponds to a confidence value in the first confidence values and a confidence value in the second confidence values.

At block 602, the SSPM system determines whether a value in the first confidence values corresponding to the current configuration setting is above a first threshold confidence value. The first threshold confidence value can vary by configuration setting or can comprise a fixed confidence value across all confidence values (e.g., 0.8). If the value is above the first threshold, operational flow proceeds to block 608. Otherwise, operational flow proceeds to block 604.

At block 604, the SSPM system determines whether a value in the second confidence values corresponding to the current configuration setting is above a second threshold confidence value. The second threshold confidence value can be identical to the first confidence value or can be distinct and tuned during training to minimize false positives and/or false negatives in predictions by the trained machine learning model. If the value is above the second threshold, operational flow proceeds to block 608. Otherwise, operational flow proceeds to block 606.

At block 606, the SSPM system indicates the current configuration setting as not correctly implemented. The SSPM system can further indicate a severity of the configuration setting that indicates a level of security exposure for the SaaS application due to the configuration setting being not correctly implemented.

At block 608, the SSPM system indicates the current configuration setting as correctly implemented. The SSPM system can further query a knowledge base database for keywords corresponding to the current configuration and can perform a substring search of web content and application content for the SaaS application for the returned keywords. The SSPM system can indicate sentences and/or paragraphs in the web content and application content that comprise one or more keywords as evidence of correct implementation for the current configuration setting.

At block 610, the SSPM system continues iterating through configuration settings. If there is an additional configuration setting of the SaaS application, operational flow returns to block 600. Otherwise, the operations in FIG. 6 are complete.

Figure 7:
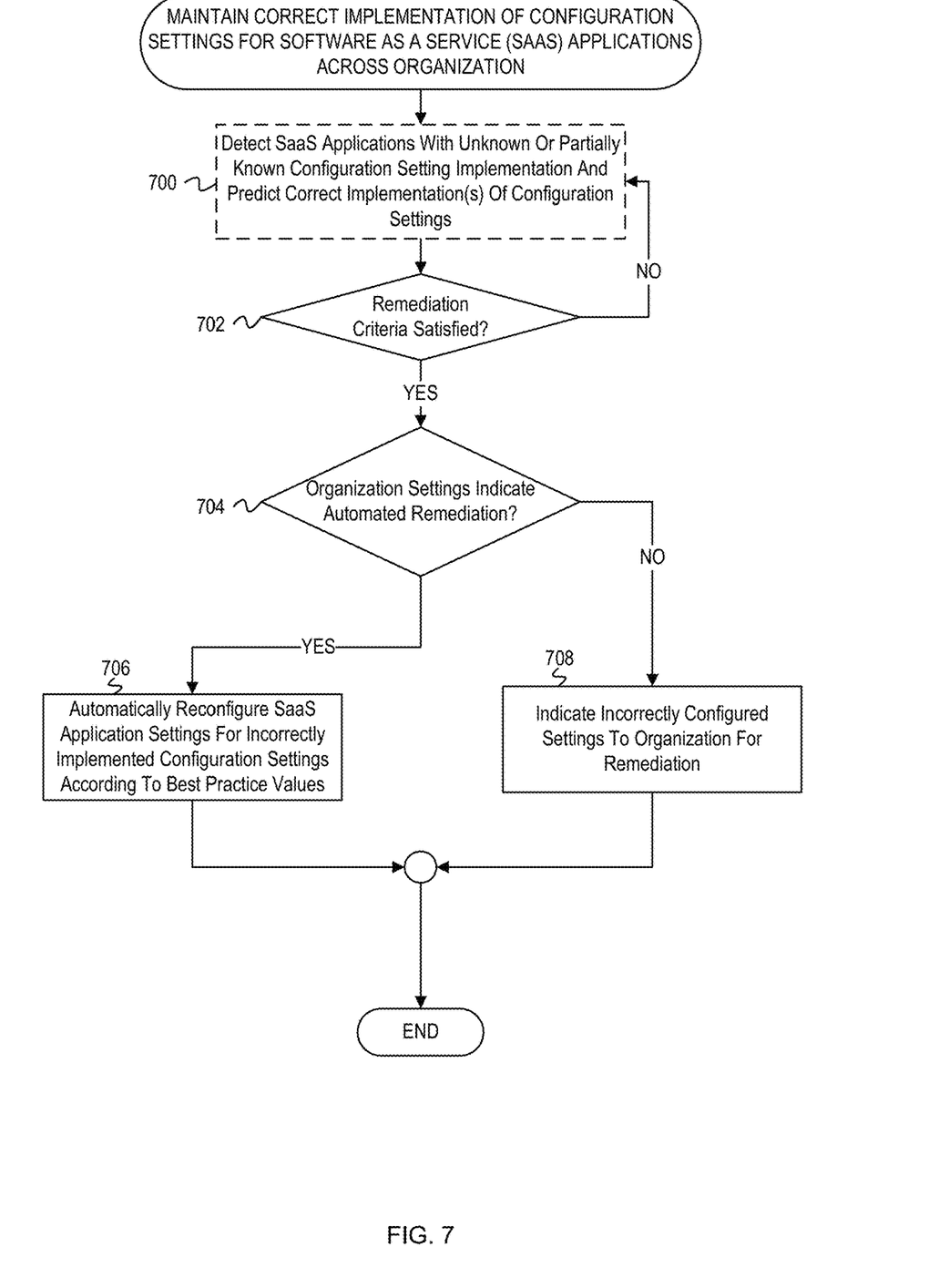
FIG. 7 is a flowchart of example operations for maintaining correct implementation of configuration settings for SaaS applications across an organization.

FIG. 7 is a flowchart of example operations for maintaining correct implementation of configuration settings for SaaS applications across an organization. At block 700, a SSPM system detects SaaS applications with unknown or partially known configuration setting implementation and predicts correct implementation(s) of configuration settings. The SSPM system can maintain a log or index of previously seen SaaS applications with known correct/incorrect implementation of configuration settings. Based on detecting a previously unseen SaaS application at the organization, for instance by detecting a process at an endpoint device that indicates an identifier of the previously unseen SaaS application, the SSPM system scrapes and preprocesses web content and/or application content for the SaaS application to input to a trained machine learning to obtain predictions of correct/incorrect implementation of configuration settings by the SaaS applications as outputs. The SSPM system further tracks previously seen SaaS applications and periodically updates the predictions of correct/incorrect implementation according to a schedule (e.g., every month) to ensure updated security posture by re-scraping content and generating predictions from the re-scraped content. Block 700 is depicted with a dashed outline to indicate that the detection of SaaS applications occurs continuously and asynchronously with the remaining operations in FIG. 7 until an external trigger (e.g., termination of the SSPM system by an administrator of the organization) occurs.

At block 702, the SSPM system determines whether remediation criteria are satisfied. The remediation criteria can comprise that a previously unseen SaaS application has been detected and the SSPM system predicts one or more incorrect implementation(s) of configuration settings for the SaaS application. If the remediation criteria are satisfied, operational flow proceeds to block 704. Otherwise, operational flow returns to block 700.

At block 074, the SSPM system determines whether the organization settings indicate automated remediation. If the organization settings indicate automated remediation, operational flow proceeds to block 706. Otherwise, operational flow proceeds to block 708. The organization settings can vary by configuration setting, and as such operational flow can simultaneously proceed to block 606 and block 608 for distinct configuration settings.

At block 706, the SSPM system automatically reconfigures the SaaS application settings for incorrectly implemented configuration settings according to best practice values. The best practice values can be determined according to standards imposed by a standardization authority such as NIST and/or the FIDO Alliance.

At block 708, the SSPM system indicates incorrectly implemented configuration settings to the organization for remediation. The incorrectly implemented configuration settings can be indicated in association with severity scores corresponding to relative importance of each configuration setting for security of the SaaS application.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 706 and 708 can be performed in parallel or concurrently across configuration settings with varying automated remediation settings for an organization. With respect to FIG. 3, hard coding the weights into the loss function of the machine learning model is not necessary. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 8:
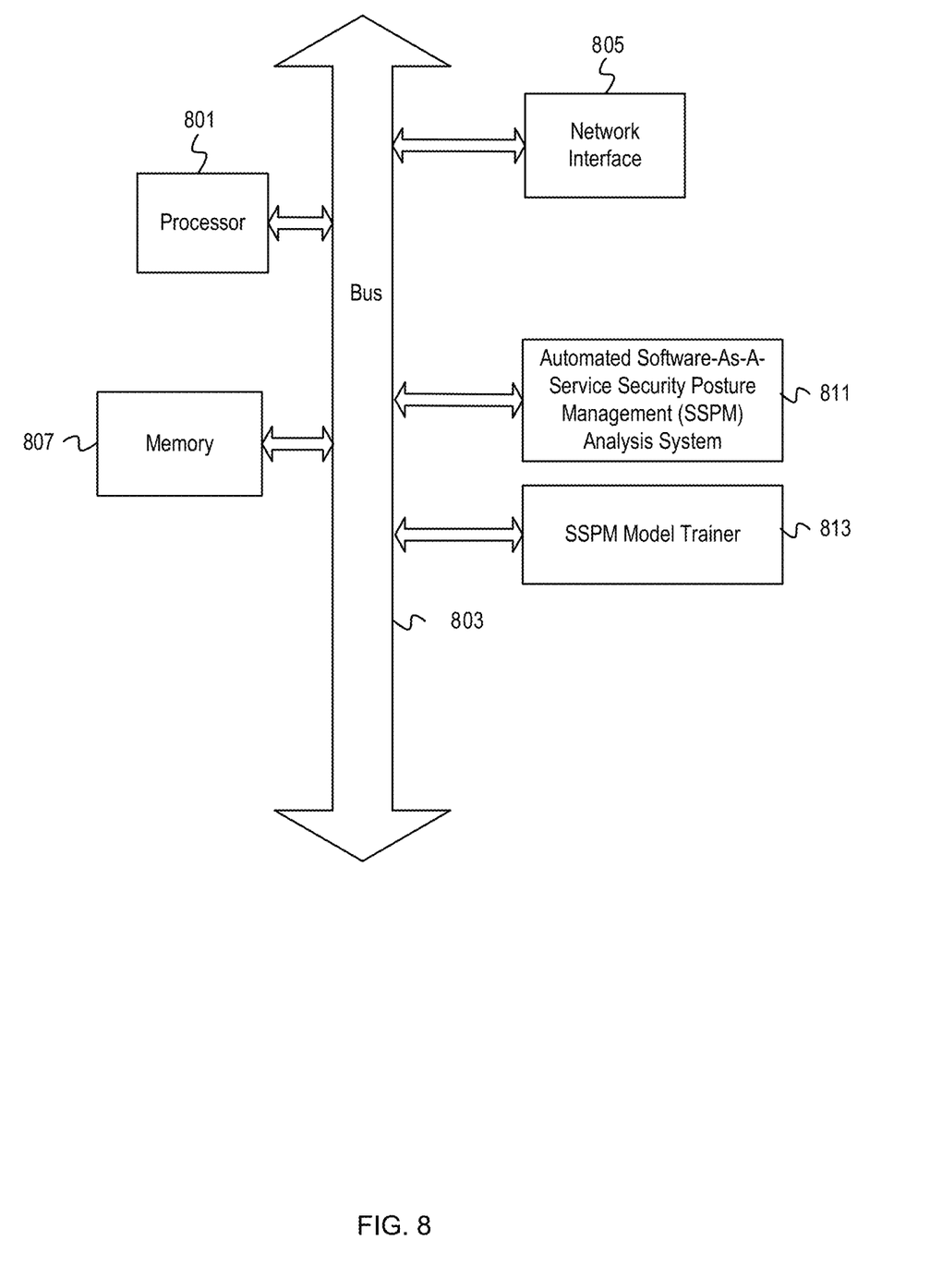
FIG. 8 depicts an example computer system with a SSPM analysis system and a SSPM model trainer.

FIG. 8 depicts an example computer system with a SSPM analysis system and a SSPM model trainer. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes an automated SSPM analysis system (SSPM system) 811 and a SSPM model trainer 813. The SSPM system 811 scrapes and preprocesses web and/or application content for a SaaS application to input into a trained machine learning model to obtain predictions of correct/incorrect implementations of configuration settings for the SaaS application. The SSPM system 811 detects new SaaS applications for an organization with unknown/partially known implementation of the configuration settings and periodically maintains correct implementations using updated prediction by the trained machine learning model. The SSPM model trainer 813 trains the machine learning model to predict correct implementation of configuration settings using content scraped from documentation of SaaS application with known correct/incorrect implementation of configuration settings. The SSPM model trainer 813 trains the machine learning model with a loss function (e.g., focal loss) that incorporates weights representing relative importance of each configuration setting. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

Terminology

A "configuration setting" as used herein refers to a setting that relates to functionality of a SaaS application. Configuration settings correspond to best Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    scraping at least one of web content and application content for a Software as a Service (SaaS) application, wherein scraping the web content comprises scraping web content from a domain associated with the SaaS application and a plurality of subdomains of the domain, wherein scraping the application content comprises scraping locally rendered pages accessible by logging in to the SaaS application;
    inputting at least one of the web content and the application content into a trained machine learning model to obtain as output a plurality of confidence values that the SaaS application correctly implements each of a plurality of configuration settings,
        wherein, during training of the trained machine learning model, a loss function applied to confidence values output by the trained machine learning model was weighted with a plurality of weights representing relative importance of corresponding configuration settings in the plurality of configuration settings,
        and wherein the plurality of configuration settings comprises at least one of password settings, multifactor authentication settings, Internet Protocol settings, user session settings, administrative user settings, data sharing permission settings, and accessing device settings; and
    based on one or more of the plurality of confidence values exceeding one or more threshold values, indicating a corresponding one or more of the plurality of configuration settings as being correctly implemented for the SaaS application.

2. The method of claim 1, wherein scraping web content for the SaaS application comprises iteratively crawling hyperlinks in web pages of the domain and the plurality of subdomains until termination criteria are satisfied.

3. The method of claim 1, wherein inputting the at least one of web content and application content into the trained machine learning model comprises,
    extracting the at least one of web content and application content with natural language processing to generate a plurality of natural language tokens; and
    inputting the plurality of natural language tokens into the trained machine learning model.

4. The method of claim 1, wherein inputting the web content into the trained machine learning model further comprises, prior to extracting the web content with natural language processing,
    applying optical character recognition to one or more images in the web content to extract a character sequence; and
    appending the character sequence to the web content.

5. The method of claim 1, wherein the trained machine learning model comprises a convolutional neural network.

6. The method of claim 1, further comprising:
    identifying a plurality of keywords each corresponding to one or more of the plurality of configuration settings; and
    determining the plurality of weights based, at least in part, on the plurality of keywords.

7. The method of claim 6, wherein determining the plurality of weights comprises determining the plurality of weights based on frequency statistics of the plurality of keywords.

8. A non-transitory machine-readable medium having program code stored thereon, the program code comprising instructions to:
    scrape one or more domains associated with a Software as a Service (SaaS) application to obtain web content for the SaaS application;
    input the web content into a trained machine learning model to obtain a first plurality of confidence values that the SaaS application correctly implements each of a plurality of configuration settings;
    based on a determination that each of the first plurality of confidence values is below a threshold value, scrape locally rendered pages accessible by logging into the SaaS application to obtain application content for the SaaS application; and input the application content into the trained machine learning model to obtain a second plurality of confidence values that the SaaS application correctly implements each of the plurality of configuration settings, wherein, during training of the trained machine learning model, a loss function applied to confidence values output by the trained machine learning model was weighted with a plurality of weights representing relative importance of corresponding configuration settings in the plurality of configuration settings, and wherein the plurality of configuration settings comprises at least one of password settings, multi-factor authentication settings, Internet Protocol settings, user session settings, administrative user settings, data sharing permission settings, and accessing device settings.

9. The non-transitory machine-readable medium of claim 8, wherein the instructions to scrape the one or more domains associated with the SaaS application comprise instructions to iteratively crawl hyperlinks in web pages of the one or more domains until termination criteria are satisfied.

10. The non-transitory machine-readable medium of claim 8, wherein the instructions to input the web content into the trained machine learning model comprise instructions to, apply optical character recognition to one or more images in the web content to extract a character sequence; and append the character sequence to the web content.

11. The non-transitory machine-readable medium of claim 8, wherein the trained machine learning model comprises a convolutional neural network.

12. The non-transitory machine-readable medium of claim 8, wherein the program code further comprises instructions to:

identify a plurality of keywords each corresponding to one or more of the plurality of configuration settings; and determine the plurality of weights based, at least in part, on the plurality of keywords.

13. The non-transitory machine-readable medium of claim 12, wherein the instructions to determine the plurality of weights comprise instructions to determine the plurality of weights based on frequency statistics of the plurality of keywords.

14. An apparatus comprising:

a processor; and a machine-readable medium having instructions stored thereon that are executable by the processor to cause the apparatus to, input first content obtained from scraping a domain associated with a Software as a Service (SaaS) application and a plurality of subdomains of the domain into a machine learning model to obtain as output a first plurality of confidence values that the SaaS application implements each of a plurality of configuration settings;

based on determining that each of the first plurality of confidence values fails first criteria for correct implementation of corresponding ones of the plurality of configuration settings, input second content obtained from scraping locally rendered pages for the SaaS application into the machine learning model to obtain as output a second plurality of confidence values that the SaaS application implements each of the plurality of configuration settings, wherein, during training of the machine learning model, a loss function applied to confidence values output by the machine learning model was weighted with a plurality of weights representing relative importance of corresponding configuration settings in the plurality of configuration settings, and wherein the plurality of configuration settings comprises at least one of password settings, multi-factor authentication settings, Internet Protocol settings, user session settings, administrative user settings, data sharing permission settings, and accessing device settings; and indicate that the SaaS application correctly implements one or more of the plurality of configuration settings corresponding to one or more of the second plurality of confidence values that satisfy second criteria.

15. The apparatus of claim 14, wherein the first content obtained from scraping the domain associated with the SaaS application and the plurality of subdomains of the domain comprises first content obtained from iteratively crawling hyperlinks in web pages of the domain and the plurality of subdomains until termination criteria are satisfied.

16. The apparatus of claim 14, wherein the second content obtained from scraping locally rendered pages for the SaaS application comprises second content obtained from logging into the SaaS application to extract the locally rendered pages.

17. The apparatus of claim 14, wherein the instructions executable by the processor to cause the apparatus to input the first content into the machine learning model comprise instructions to, apply optical character recognition to one or more images in the first content to extract a character sequence; and append the character sequence to the first content.

18. The apparatus of claim 14, wherein the machine learning model comprises a convolutional neural network.

19. The apparatus of claim 14, wherein the machine-readable medium further has stored thereon instructions executable by the processor to cause the apparatus to:

identify a plurality of keywords each corresponding to one or more of the plurality of configuration settings; and determine the plurality of weights based, at least in part, on the plurality of keywords.

20. The apparatus of claim 19, wherein the instructions to determine the plurality of weights comprise instructions executable by the processor to cause the apparatus to determine the plurality of weights based on frequency statistics of the plurality of keywords.

* * * * *

UNITED STATES PATENT AND TRADEMARK OFFICE
CERTIFICATE OF CORRECTION

| | | |
|---|---|---|
| PATENT NO. | : 12,475,177 B2 | Page 1 of 1 |
| APPLICATION NO. | : 18/309246 | |
| DATED | : November 18, 2025 | |
| INVENTOR(S) | : Nandini Ramanan et al. | |

It is certified that error appears in the above-identified patent and that said Letters Patent is hereby corrected as shown below:

In the Specification

Column 12, Line 21, the word "vales", should read --values--

Signed and Sealed this
Twenty-third Day of December, 2025

John A. Squires
*Director of the United States Patent and Trademark Office*